(12) United States Patent
Burkner

(10) Patent No.: US 12,097,919 B1
(45) Date of Patent: Sep. 24, 2024

(54) METHOD AND VEHICLE FOR PLACING IRRIGATION PIPE INTO A FIELD

(71) Applicant: AG INDUSTRIAL MANUFACTURING INC., Lodi, CA (US)

(72) Inventor: Paul F. Burkner, Stockton, CA (US)

(73) Assignee: AG INDUSTRIAL MANUFACTURING INC., Lodi, CA (US)

( * ) Notice: Subject to any disclaimer, the term of this patent is extended or adjusted under 35 U.S.C. 154(b) by 0 days.

(21) Appl. No.: 18/165,169

(22) Filed: Feb. 6, 2023

Related U.S. Application Data

(60) Provisional application No. 63/267,650, filed on Feb. 7, 2022.

(51) Int. Cl.
*B62D 61/08* (2006.01)
*B62D 5/09* (2006.01)
*F16L 1/032* (2006.01)

(52) U.S. Cl.
CPC .............. *B62D 61/08* (2013.01); *B62D 5/09* (2013.01); *F16L 1/032* (2013.01)

(58) Field of Classification Search
CPC ...... B62D 49/0607; B62D 5/09; B62D 61/08; F16L 1/024; F16L 1/0243; F16L 1/032; B60W 10/04; B60W 10/06; B60W 30/18; B60W 30/1818; B60W 30/188; B60W 30/1882; B60W 40/06; B60W 2300/152
See application file for complete search history.

(56) References Cited

U.S. PATENT DOCUMENTS

| | | | | |
|---|---|---|---|---|
| 2,749,997 A * | 6/1956 | Deslippe | ............... | B62K 5/027 280/DIG. 6 |
| 3,040,510 A * | 6/1962 | Van Der Lely | ........ | A01B 31/00 280/472 |
| 3,255,901 A * | 6/1966 | Aubry | .................... | A01G 25/09 414/528 |
| 3,455,404 A * | 7/1969 | Hansen | ................ | A01B 51/026 180/209 |
| 4,093,082 A * | 6/1978 | Goodsell | ................ | A01G 25/09 405/184.5 |
| 4,832,263 A * | 5/1989 | Poynor | ................... | B29C 53/50 239/723 |

(Continued)

FOREIGN PATENT DOCUMENTS

| | | | | |
|---|---|---|---|---|
| AU | 2003229097 A1 * | 12/2003 | ................ | B61L 3/00 |
| DE | 20304028 U1 * | 5/2003 | ............. | A01G 1/125 |

(Continued)

OTHER PUBLICATIONS

FR 2727820 A1 machine translation from espacenet.com (Year: 2024).*

*Primary Examiner* — Amy R Weisberg
*Assistant Examiner* — Maxwell L Meshaka
(74) *Attorney, Agent, or Firm* — Steven R. Vosen

(57) ABSTRACT

A vehicle for placing irrigation pipe, and a method for placing irrigation pipe, is described. The vehicle has a tricycle configuration, with in-line a front steerable drive wheel, a rear drive wheel and a pipe clamp, and an adjustable side idler wheel that provides stability. As the vehicle moves though a field, pulling ever increasing length of pipe, the force provided by the drive wheels increases in proportion.

22 Claims, 11 Drawing Sheets

(56) References Cited

U.S. PATENT DOCUMENTS

| | | | | |
|---|---|---|---|---|
| 5,651,639 | A * | 7/1997 | Wentworth | F16L 55/1657 405/184 |
| 7,610,989 | B2 * | 11/2009 | Vigholm | F15B 20/002 180/419 |
| 7,654,774 | B1 * | 2/2010 | Jarred | F16L 1/032 405/184 |
| 7,823,675 | B2 * | 11/2010 | Kermani | A61G 5/1051 180/211 |
| 7,885,738 | B2 * | 2/2011 | Park | G05D 1/0255 701/23 |
| 8,602,153 | B2 * | 12/2013 | Osswald | B62D 21/14 180/209 |
| 9,022,154 | B2 * | 5/2015 | Sato | A63C 17/12 180/181 |
| 9,528,634 | B2 * | 12/2016 | Ephan, Jr. | A01G 25/00 |
| 9,925,667 | B1 * | 3/2018 | Berard | B25J 13/085 |
| 10,443,760 | B2 * | 10/2019 | Henry | B60P 3/035 |
| 10,525,946 | B2 * | 1/2020 | Shimanaka | B62D 15/021 |
| 10,688,667 | B1 * | 6/2020 | Berard | B62D 57/032 |
| 10,821,838 | B2 * | 11/2020 | Ienaga | B60L 15/2054 |
| 11,247,344 | B2 * | 2/2022 | Berard | B62D 57/032 |
| 2005/0146115 | A1 * | 7/2005 | Vigholm | F15B 20/008 280/426 |
| 2006/0229774 | A1 * | 10/2006 | Park | G05D 1/0238 701/26 |
| 2009/0038186 | A1 * | 2/2009 | Osswald | B62D 49/085 37/468 |
| 2010/0032223 | A1 * | 2/2010 | Kermani | B62B 5/0026 180/216 |
| 2013/0115005 | A1 * | 5/2013 | Ephan, Jr. | F16L 1/032 405/154.1 |
| 2014/0076643 | A1 * | 3/2014 | Osswald | E02F 3/96 180/9.1 |
| 2015/0008058 | A1 * | 1/2015 | Sato | B60L 3/00 180/181 |
| 2018/0236988 | A1 * | 8/2018 | Shimanaka | B60T 7/20 |
| 2020/0290213 | A1 * | 9/2020 | Berard | B62D 57/032 |
| 2022/0134576 | A1 * | 5/2022 | Berard | B25J 13/085 700/254 |
| 2022/0135123 | A1 * | 5/2022 | Black | A01B 37/00 74/388 PS |
| 2023/0234596 | A1 * | 7/2023 | Woo | B60W 10/18 701/41 |

FOREIGN PATENT DOCUMENTS

| | | | | |
|---|---|---|---|---|
| DE | 102020119463 | A1 * | 1/2022 | |
| EP | 0177375 | A1 * | 4/1986 | |
| EP | 2108745 | A2 * | 10/2009 | E02F 5/10 |
| FR | 2636032 | A1 * | 3/1990 | |
| FR | 2678888 | A1 * | 1/1993 | B60G 17/00 |
| FR | 2727820 | A1 * | 6/1996 | A01B 51/026 |
| FR | 2788404 | A1 * | 7/2000 | A01B 75/00 |
| FR | 2804078 | A1 * | 7/2001 | B62D 49/0607 |
| FR | 2823174 | A1 * | 10/2002 | A01G 3/0408 |
| JP | 2596571 | B2 * | 4/1997 | |

* cited by examiner

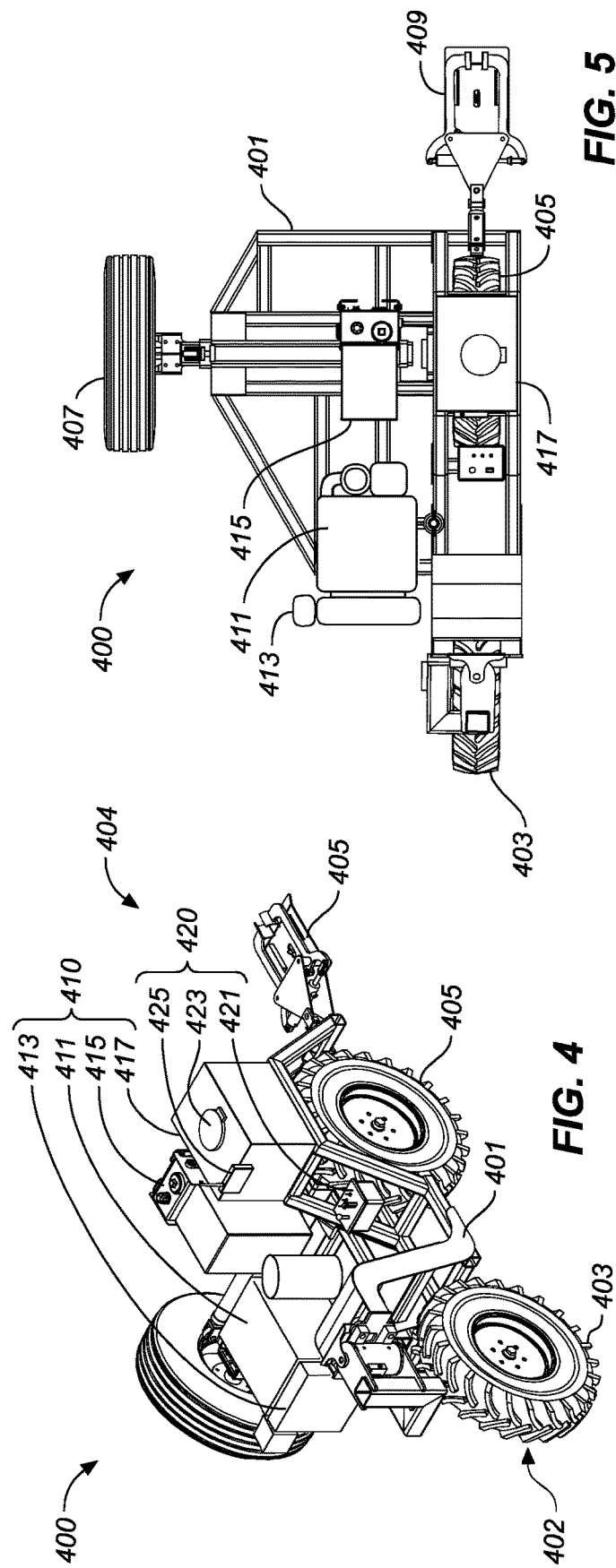
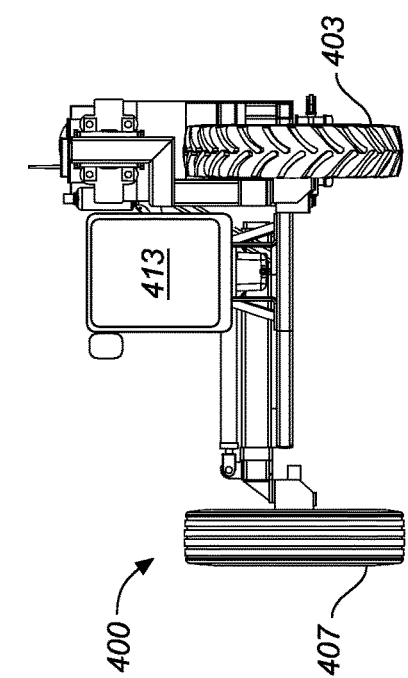
*FIG. 4*
*FIG. 5*
*FIG. 6*

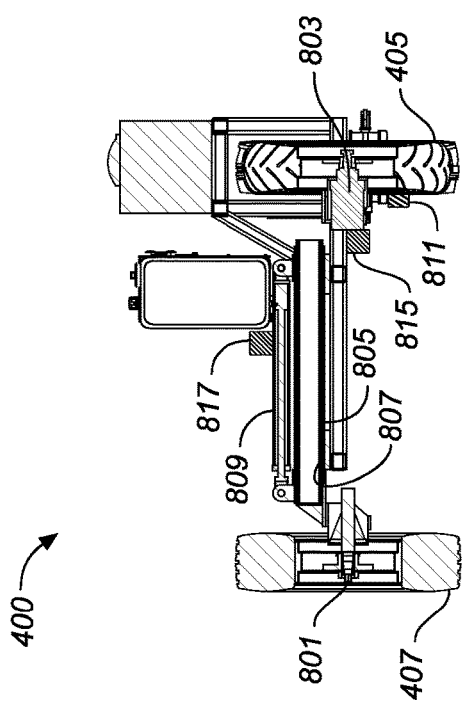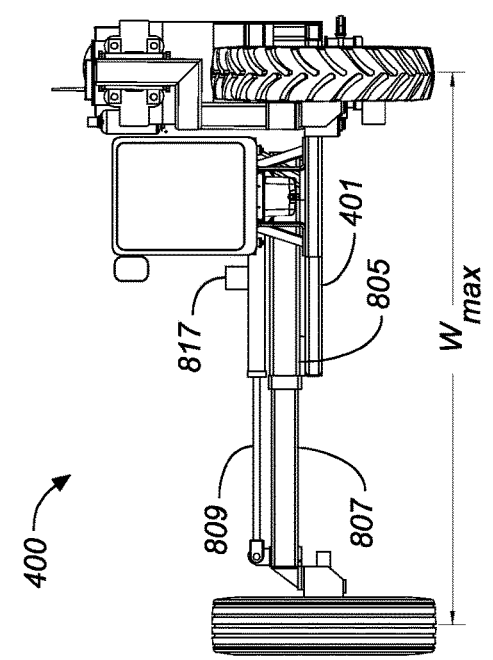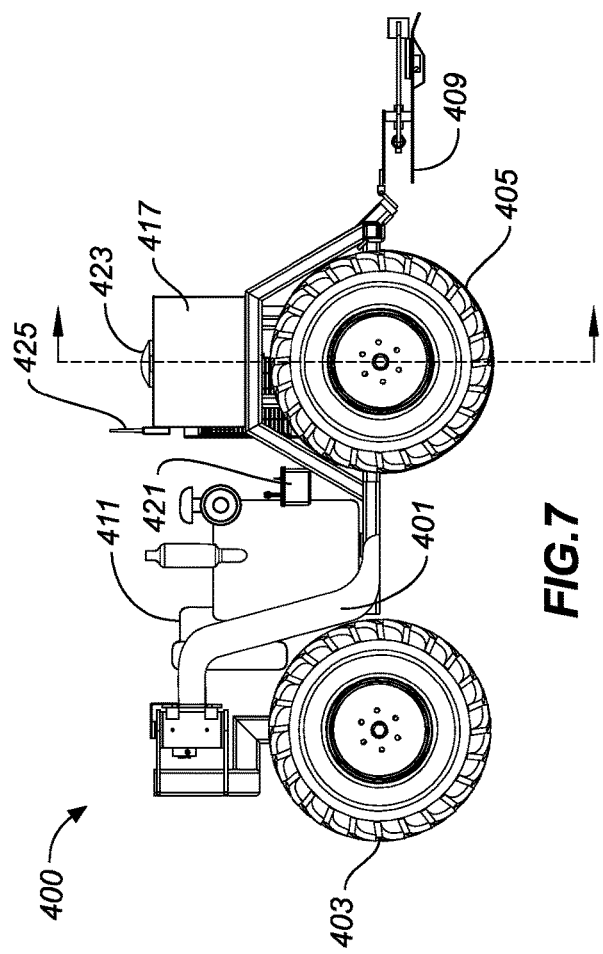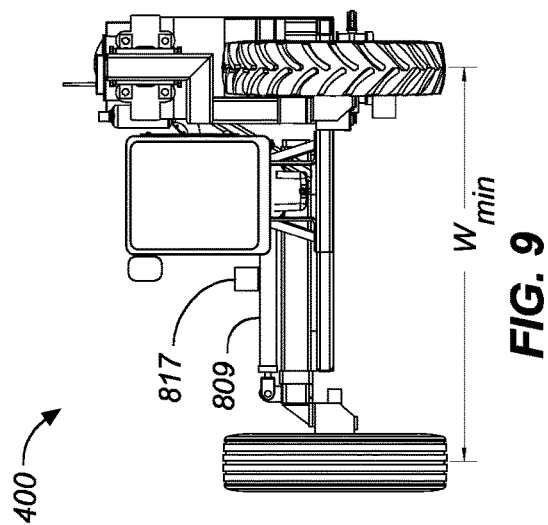

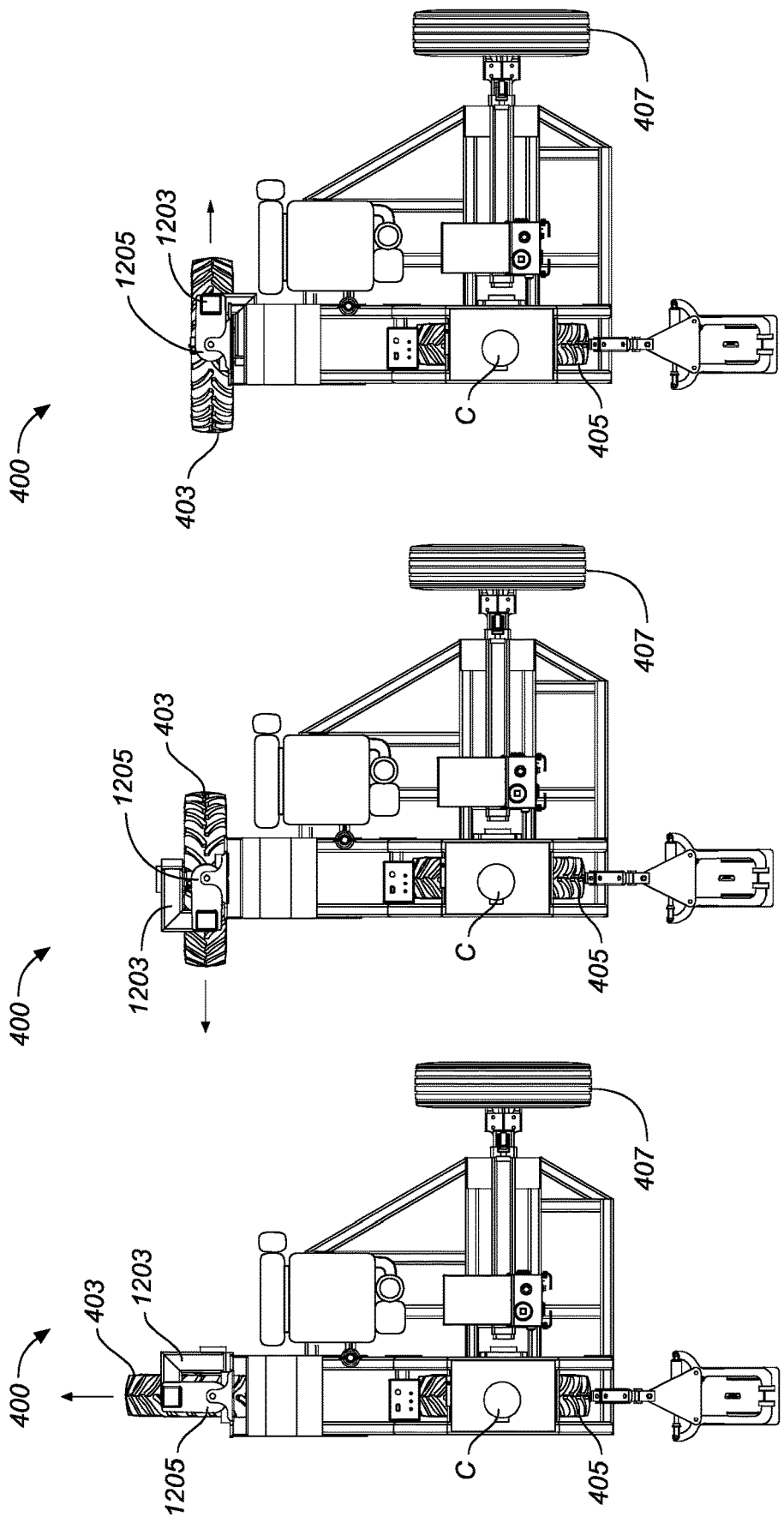

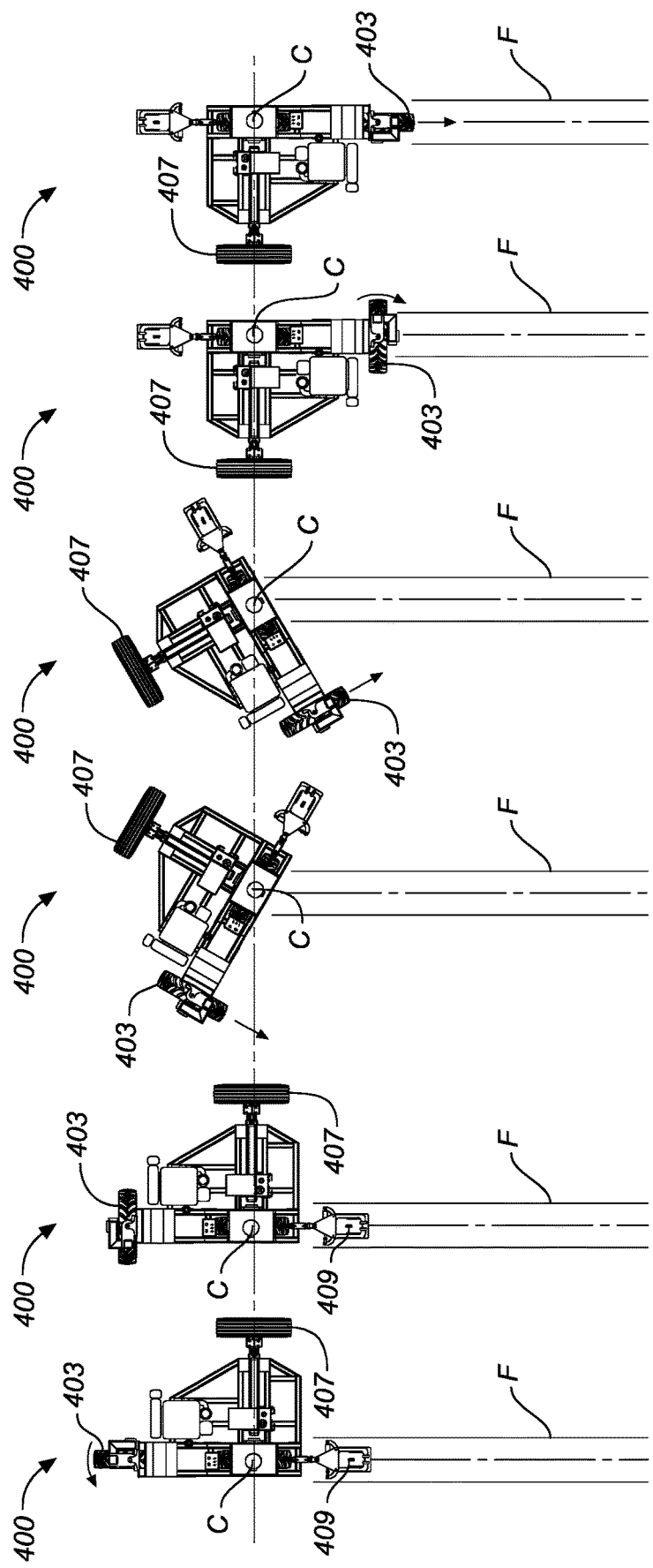

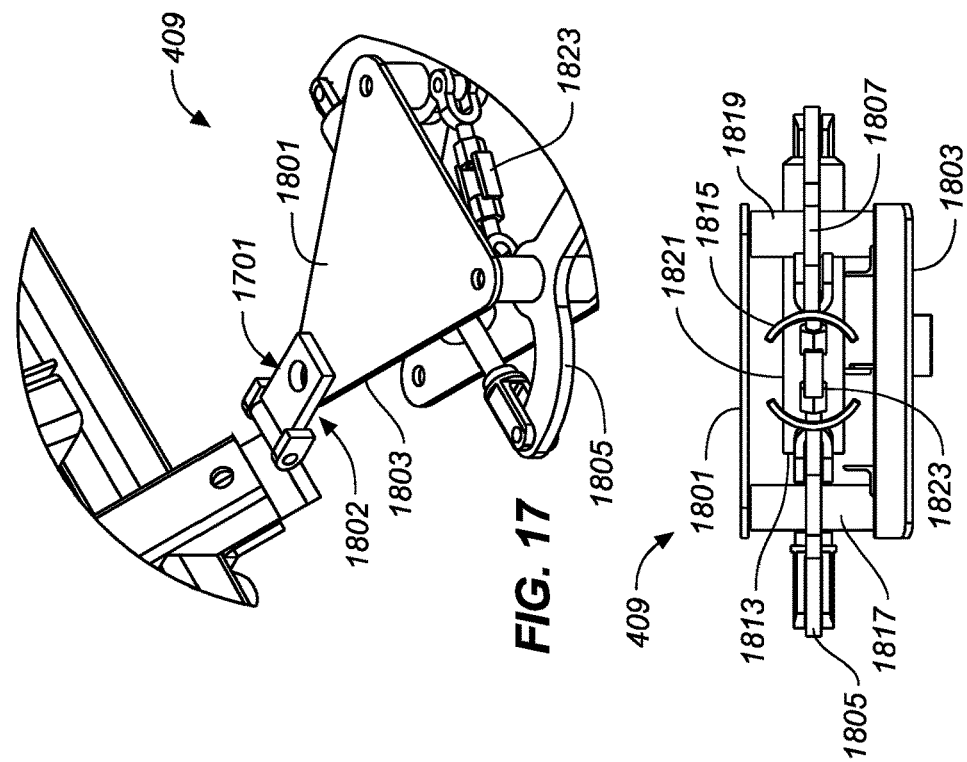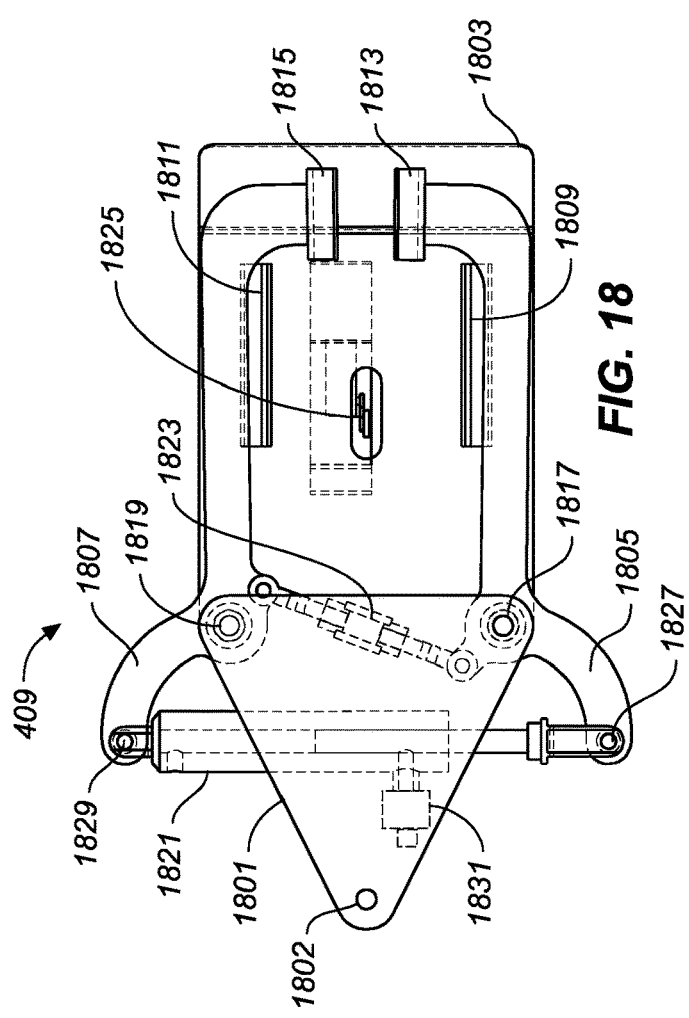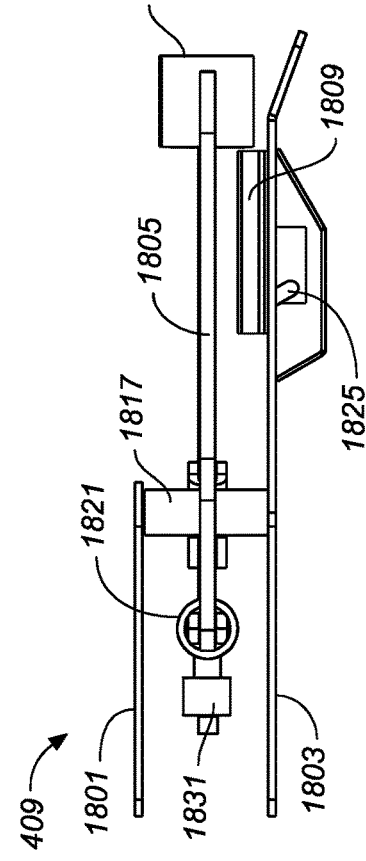

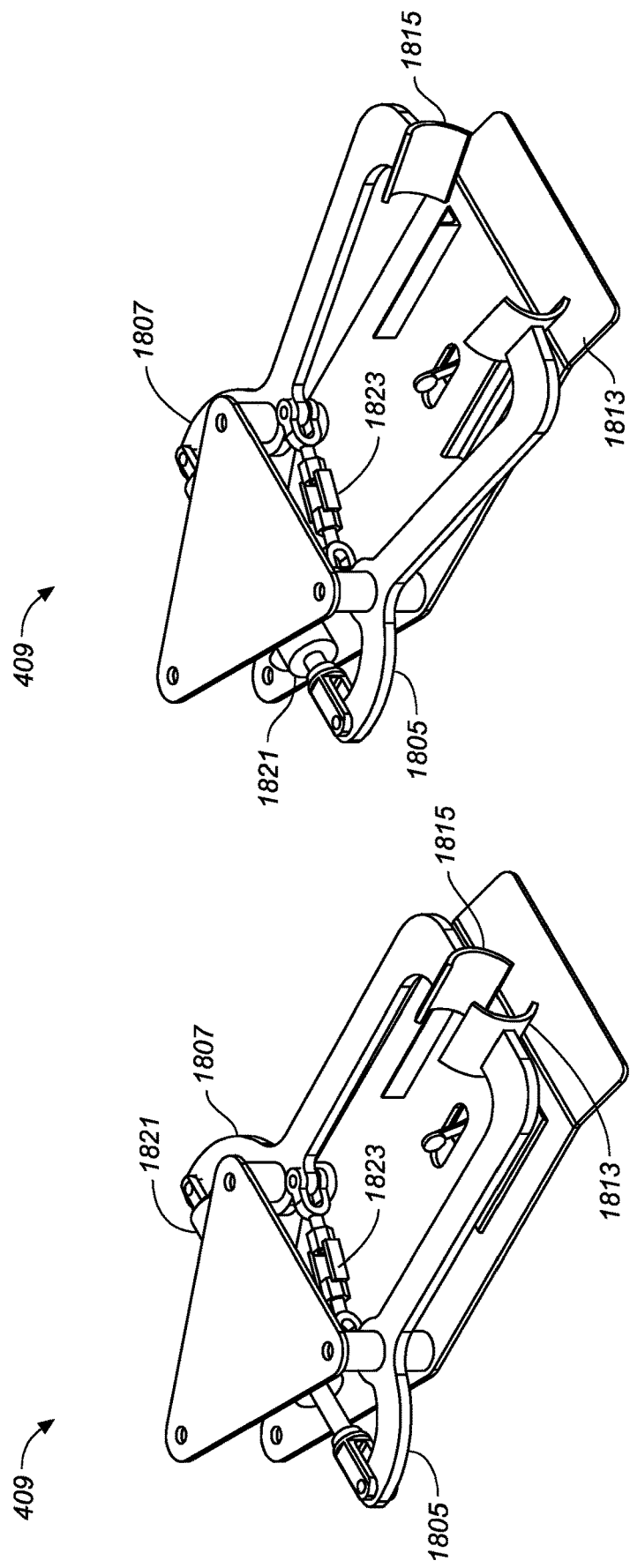

METHOD AND VEHICLE FOR PLACING IRRIGATION PIPE INTO A FIELD

CROSS-REFERENCE TO RELATED APPLICATIONS

This application claims the benefit of U.S. Provisional Application No. 63/267,950, filed Feb. 7, 2023, the contents of which are hereby incorporated by reference in its entirety.

BACKGROUND OF THE INVENTION

Field of the Invention

The present invention generally relates to agricultural equipment, and more specifically to a vehicle and methods of operating a vehicle for placing irrigation pipe in a field.

Discussion of the Background

Agricultural crops are often grown with water delivered through an irrigation system. One very efficient way for this water delivery is through a solid set of surface sprinklers. Water is supplied through a network of surface pipes with sprinklers attached that will uniformly distribute water over the whole field. Installing such a system has been a laborious task for workers to lay out and connect the sprinkler pipes.

In many agricultural and horticultural settings, rigid, above-ground, portable sprinkler systems are used for irrigation of crops, pasture, trees, or grasses, etc. These systems have, over the years, replaced many other forms of irrigation, such as flood irrigation, because they minimize erosion, prevent many drainage problems, do not require land leveling, and generally provide a uniform application of moisture to irrigate crops on a variety of terrains and minimal management expertise while conserving water. Sprinkler irrigation systems are typically constructed from modular sections of either aluminum or polyvinyl chloride (PVC) that include pipes, risers, sprinkler heads and connectors that are assembled and disassembled in the field as needed.

One common irrigation system, often called a "solid-set" system, includes a main line that provides water to a plurality of lateral lines. Each lateral line of the plurality of lateral lines has a plurality of sprinkler heads positioned to irrigate a field. In some solid-set systems, the lateral lines provide water to the entire field. Other solid-set systems, the lateral lines provide water to only a portion of the field, and the lateral lines are disassembled and then reassembled at different positions along the main line as needed. When the irrigation season is over, the solid-set system may be disconnected and stored so that the crops may be harvested, and the ground may be worked in preparation for the next growing season.

Examples of prior art solid-set irrigation systems are shown in prior art FIGS. 1-3 where: FIG. 1 shows a top schematic view of an irrigation system 100 for irrigating a field with a single set-up; FIG. 2 is a perspective view of FIG. 1, and FIG. 3 is a perspective view of a specific coupler.

With reference to FIG. 1, irrigation system 100 includes a main line 110 that accepts a flow of water W from a pump (not shown) and that has a length M over which water is delivered to a plurality of lateral lines 120 each having a length L and arranged parallel on a field. Thus, for example, it is common to use a solid-set irrigation system to irrigate row crops having, for example, one or more lateral lines with sprinkler heads on 30 or 40 foot linear spacing and 40 feet between lateral lines, and the length L can be from 20 feet to half a mile. Typically, the diameter of irrigation main line 110 is from 6 to 12 inches and the diameter of the lateral lines a plurality of lateral lines 120 are from 1½ to 4 inches. Alternatively, the length and/or pattern of the plurality of lateral lines 120 can be different from line to line to irrigate an irregular shaped plot of land.

Irrigation system 100 may be formed from a collection of modular pipe, coupler, and sprinkler segments. Thus, for example, main line 110 includes a plurality of main line pipe segments 111, with adjacent segments are joined by one of a plurality of couplers 113. Each lateral line of the plurality of lateral lines 120 includes a plurality of lateral pipe segments 121, with adjacent segments joined by a coupler of a plurality of couplers 123. Each lateral line of the plurality of lateral lines 120 extends length L from an end 112 that is connected to main line 110 at each coupler of the plurality of couplers 123 to another end 114. As shown in FIG. 2, each couplers of the plurality of couplers 123 is also attached to a riser 125 that protrude from the field and terminates with a sprinkler head 127. Commonly used materials include aluminum, polyethylene, or PVC tubing, and stainless steel and/or polyethylene or nylon fittings.

Particularly useful solid-set irrigation systems include PVC tubing and couplers such as, for example and without limitation, the CERTA-LOK® YELOMINE® Restrained Joint PVC Pressure Piping System for the main lines, and the CERTA-SET® Agricultural Irrigation Piping System for the lateral lines, both of which are manufactured by Westlake Pipe and Fittings, Huston, Texas.

In these solid-set irrigation systems, pipe segments are joined using coupling devices that allow for rapid breakdown and packaging of the irrigation system. This irrigation system is particularly easy to use, as the pipes are spline-coupled—that is, they are held together with "splines" that are inserted into the coupler. The couplers include an O-ring to seal against an accepted pipe, and the couplers and pipe ends have matching circumferential grooves for accepting the spline. The spline is a flexible elongated strip the fits within the matching circumferential grooves and that, when inserted, keeps the joint together by preventing relative lateral motion.

An example of a CERTA-LOK® YELOMINE® or CERTA-SET® pipe and coupler is illustrated in the perspective view of FIG. 3. A first pipe segment 301a and a second pipe segment 301b of the plurality of lateral pipe segments 121 are joined by a coupler 303. Coupler 303 also includes an adapter 304 for accepting lateral pipes, such as a riser 305 terminated by a sprinkler head 307. Alternatively, first pipe segment 301a and second pipe segment 301b of the plurality of main line pipe segments 111, with adapter 304 configured to accept a lateral pipe segment of the plurality of lateral pipe segments 121, or coupler 303 can be configured to joint adjacent segments without an adapter to another pipe or riser.

Coupler 303 has a first end 304a for accepting first pipe segment 301a and a hole 306a for inserting a first spline 308a, and a second end 304b for accepting second pipe segment 301b and a hole 306b for inserting second spline 308b. When each end 304a or 304b accepts an end of a first pipe segment 301a or second pipe segment 301b, grooves within each end and the corresponding end of first pipe segment 301a or second pipe segment 301b form a groove for accepting an inserted first spline 308a or second spline 308b to laterally restrain the pipe segments. Removal of first spline 308a or second spline 308b allows for removal of the corresponding first pipe segment 301a or second pipe segment 301b from the coupler.

When properly seated, the groove can accept a spline that is removably insertable through the side of the coupler. An accepted spline nearly encircles the pipe and coupler and prevents relative longitudinal movement of the pipe and coupler. Coupling is accomplished by pushing the pipe and coupler together and inserting a spline. Decoupling is accomplished by pulling a spline from the coupler of a coupled pipe and pulling the pipe and couplers apart. A sprinkler having a reactionary drive mechanism may be coupled to any of the couplers through quick coupling risers, or by pinning or threading.

The assembly or disassembly of solid-set irrigation systems is commonly performed by arranging pipe segments and coupling or decoupling them, respectively. The assembly and disassembly is usually performed manually in the field. Although the advent of PVC solid-set irrigation systems is lighter and couples more easily that metal irrigation systems, such irrigation systems still require considerable time and effort for assembling and disassembling. This work includes the placement and movement of heavy and bulky pipe segments that requires teams of workers. After irrigation the pipe segments are embedded in the mud, making movement difficult. The manual manipulation of piping requires a lot of work that is difficult to do on a timely basis. Occasionally the work results in injury to the workers and delays due to mud in the field.

Some devices have been proposed to automate the assembly irrigation pipes. These irrigation systems require the movement of pipe segments, couplers and risers across the field. Such irrigation systems are not useful for irrigation systems requiring the movement of lateral lines during a growing season since the use of the devices would disrupt large portions of the cultivated field.

Other devices have been proposed to automate the disassembly of irrigation pipes by grabbing portions of the pipe and pull them out of the field. These irrigation systems can damage piping and are not useful for assembling pipe. In addition, these other devices are typically too wide to fit the existing head lands of the field.

While the use of solid-set irrigation systems has greatly improved the ability to irrigate, and while plastic piping, such as PVC piping has made such irrigation systems more robust and easier to assemble and disassemble, there are still several problems. Thus, for example, the assembly and disassembly are either performed manually by teams of workers or by proposed devices that are not useful for all uses and applications.

Other apparatus and methods for providing irrigation pipes to an agricultural field are described, for example, in prior art U.S. Pat. No. 7,1065,985, which is incorporated herein by reference. By way of example, U.S. Pat. No. 7,1065,985 illustrate a device that receives and assembles pipe sections into an ever increasing length of pipe, and a vehicle which pulls on an end of the first pipe section to provide the pipe in the field, where the vehicle is a tractor or an all-terrain vehicle.

While the use prior art irrigation systems, such as those of U.S. Pat. No. 7,1065,985 present a great advantage over previous irrigation systems, there are problems with such irrigation systems. Thus, for example, it has been found that that prior art irrigation systems lack the ability to: coordinate the prior art vehicle's forward travel with action of the pipe assembler; use the vehicle for a range of row spacings; autonomous place the pipe; provide for vertical and horizontal movement of the pipe end; turn around in a tight space; adjust the tractive force with the length of pipe being pulled; automatically release the end of a pipe segment.

Thus, there is a need in the art for a method and apparatus that permits for the easy assembly and disassembly of modular piping irrigation systems. Such a method and apparatus should be compatible with existing piping irrigation systems, be useful for a variety of solid-set irrigation set-ups, facilitate the coupling or decoupling of pipe components, and should not damage the pipe or components. There is also a need for an irrigation system and method for removing piping from the field while the field is still wet.

BRIEF SUMMARY OF THE INVENTION

The present invention overcomes the disadvantages of prior art by providing a vehicle for placing irrigation pipe in an agricultural field.

It is one aspect of the present invention to provide a vehicle for pulling irrigation pipe into an agricultural field that has an adjustable track width such that the vehicle can accommodate a range of row spacings.

It is another aspect of the present invention to provide a vehicle for placing pipe in a field, where the vehicle is autonomous and self-propelled.

It is yet another aspect of the present invention to provide a hitch for holding the end of a pipe segment that can independently rotate vertically and horizontally.

In some aspects, the techniques described herein relate to an adjustable track width vehicle for providing pipe to an agricultural field, said vehicle including: a frame; a hitch attachable to an end of a length of pipe; a front wheel supported by the frame; a pair of rear wheels supported by the frame, where said pair of rear wheels includes a rear drive wheel and an idler wheel; and an actuator coupling said pair of wheels, where the actuator is operable to adjust the track width of the pair of wheels.

In some aspects, the techniques described herein relate to a vehicle, where said rear drive wheel has an axis of rotation, where said idler wheel has an axis of rotation, and where the axis of rotation of the rear drive wheel is colinear with the axis of rotation of the idler wheel.

In some aspects, the techniques described herein relate to a vehicle, where said front wheel is a front drive wheel, and where said front drive wheel is steerable.

In some aspects, the techniques described herein relate to a vehicle, where said front drive wheel is steerable by at least ±90 degrees.

In some aspects, the techniques described herein relate to a vehicle, where said rear drive wheel is in line with the front drive wheel.

In some aspects, the techniques described herein relate to a vehicle, where the vehicle has a distance travelled from an initial location, where the length of pipe increases linearly with the distance travelled, and where a tractive force provided to the front drive wheel and to the rear drive wheel increases linearly with distance travelled.

In some aspects, the techniques described herein relate to a vehicle, where said vehicle further include electronics including a processor and memory, where said processor is programmed to determine a distance travelled and to adjust a tractive force of the front drive wheel and the tractive force of the rear drive wheel according to the distance travelled.

In some aspects, the techniques described herein relate to a vehicle, where the electronics adjust the tractive force linearly with the distance travelled.

In some aspects, the techniques described herein relate to a vehicle, where said vehicle includes a hydraulic system including a hydraulic conditioning unit (HCU) that provides hydraulic fluid to a front hydraulic motor that powers the front drive wheel according to a setting or a front hydraulic motor valve and provides hydraulic fluid to a rear hydraulic motor that powers the rear drive wheel according to a setting on a rear hydraulic motor valve, and where said actuator is a hydraulic cylinder, where said HCU provides hydraulic fluid to the actuator according to a setting on a hydraulic cylinder valve.

In some aspects, the techniques described herein relate to a vehicle, where said vehicle further include electronics including a processor and memory, where said processor is programmed to determine a distance travelled and to adjust a tractive force of the front drive wheel according to the front motor valve setting and to adjust the tractive force of the rear drive wheel according to the rear motor valve setting, where the tractive force increases linearly with the distance travelled.

In some aspects, the techniques described herein relate to a vehicle, where said processor is programmed to adjust the track width by adjusting the setting on the hydraulic cylinder valve.

In some aspects, the techniques described herein relate to an adjustable track width vehicle for providing pipe to an agricultural field, said vehicle including: a frame; a hitch attachable to an end of a length of pipe; a front drive wheel supported by the frame, where said front drive wheel is powered by a front hydraulic motor and is steerable; a pair of rear wheels supported by the frame, where said pair of rear wheels includes a rear drive wheel and an idler wheel, where said rear drive wheel is powered by a rear hydraulic motor, has an axis of rotation and is in line with the front drive wheel, where said idler wheel has an axis of rotation, and where the axis of rotation of the rear drive wheel is colinear with the axis of rotation of the idler wheel; an hydraulic cylinder coupling said pair of wheels, where the hydraulic cylinder is operable to adjust the track width of the pair of wheels; and a hydraulic system including a hydraulic conditioning unit (HCU) that provides hydraulic fluid to a front hydraulic motor according to a setting or a front hydraulic motor valve, provides hydraulic fluid to a rear hydraulic motor according to a setting on a rear hydraulic motor valve, and provides hydraulic fluid to the hydraulic cylinder according to a setting on a hydraulic cylinder valve.

In some aspects, the techniques described herein relate to a vehicle, where said front drive wheel is steerable by at least ±90 degrees.

In some aspects, the techniques described herein relate to a vehicle, where the vehicle has a distance travelled from an initial location, where the length of pipe increases linearly with the distance travelled, and where a tractive force provided to the front drive wheel and to the rear drive wheel increases linearly with distance travelled according to the setting on the front hydraulic motor valve and the rear hydraulic motor valve.

In some aspects, the techniques described herein relate to a vehicle, where said vehicle further include electronics including a processor and memory, where said processor is programmed to determine a distance travelled and to adjust the setting on the front hydraulic motor valve and the rear hydraulic motor valve according to the distance travelled.

In some aspects, the techniques described herein relate to a vehicle, where the setting of the front hydraulic motor valve and the setting of the rear hydraulic motor valve increases the tractive force linearly with the distance travelled.

In some aspects, the techniques described herein relate to a method for a vehicle to pull a length of irrigation pipe over a ground, where the length of irrigation pipe is a distance travelled by the vehicle from an initial location, where the vehicle includes one or more drive wheels capable of imparting a tractive force to the ground, said method including: determining a distance travelled by the vehicle from an initial location; and increasing the tractive force to said one or more drive wheels in proportion to the distance travelled.

In some aspects, the techniques described herein relate to a method, where said tractive force increases linearly with the distance travelled.

In some aspects, the techniques described herein relate to a method, where increasing the tractive force includes increasing a torque provided to each of said one or more drive wheels.

In some aspects, the techniques described herein relate to a method, where each drive wheel of said one or more drive wheels is powered by a corresponding a hydraulic motor, where the vehicle includes a hydraulic system adapted to provide a controllable pressure of a hydraulic fluid to each hydraulic motor corresponding to the one or more drive wheels, and where said increasing the tractive force includes increasing the pressure of the hydraulic fluid to each hydraulic motor corresponding to the one or more drive wheels.

In some aspects, the techniques described herein relate to a method, where said vehicle includes: a front drive wheel, where said front drive wheel is steerable; a pair of rear wheels, where said pair of rear wheels includes a rear drive wheel and an idler wheel, where said rear drive wheel has an axis of rotation and is in line with the front drive wheel, where said idler wheel has an axis of rotation, and where the axis of rotation of the rear drive wheel is colinear with the axis of rotation of the idler wheel; a hydraulic cylinder coupling said pair of rear wheels, where the hydraulic cylinder is operable to adjust the track width of the pair of rear wheels; a hydraulic system including a hydraulic conditioning unit (HCU) that provides hydraulic fluid to a front hydraulic motor according to a setting or a front hydraulic motor valve, provides hydraulic fluid to a rear hydraulic motor according to a setting on a rear hydraulic motor valve, and provides hydraulic fluid to the hydraulic cylinder according to a setting on a hydraulic cylinder valve, and where said vehicle further include electronics including a processor and memory, where said processor is programmed to determine a distance travelled by the vehicle from an initial location, and increase the tractive force by the one or more drive wheels as the distance travelled increases.

In some aspects, the techniques described herein relate to an apparatus including vehicle to pull a length of irrigation pipe over a ground, where the length of irrigation pipe pulled by the vehicle increases with a distance travelled by the vehicle from an initial location, where the vehicle includes one or more drive wheels each powered by a motor, and electronics including a processor and memory, where said processor is programmed to: determine a distance travelled by the vehicle from an initial location, and increase a tractive force of the one or more drive wheels with the distance travelled.

In some aspects, the techniques described herein relate to an apparatus, where said one or more drive wheels include: a front drive wheel powered by a front hydraulic motor; a rear drive wheel powered by a front hydraulic motor, where said rear drive wheel is in line with the front drive wheel; and a hydraulic system that provides hydraulic fluid to the front hydraulic motor according to a setting on a front hydraulic motor valve and provides hydraulic fluid to a rear hydraulic motor according to a setting on a rear hydraulic motor valve.

In some aspects, the techniques described herein relate to an apparatus, where said vehicle further includes: a front drive wheel that is steerable; an idler wheel having an axis of rotation colinear with an axis of rotation of the rear drive wheel; an hydraulic cylinder coupling said idler wheel and said rear drive wheel, where the hydraulic cylinder is operable to adjust the track width of the pair of wheels; and where said a hydraulic system provides hydraulic fluid to the hydraulic cylinder according to a setting on a hydraulic cylinder valve.

In some aspects, the techniques described herein relate to a vehicle, where said front drive wheel is steerable by at least ±90 degrees.

In some aspects, the techniques described herein relate to a vehicle, where said processor is programmed to increase the tractive force by adjusting the setting on the front hydraulic motor valve and the setting on the rear hydraulic motor valve according to the distance travelled.

In some aspects, the techniques described herein relate to a vehicle, where the setting on the front hydraulic motor valve and the rear hydraulic motor valve increase the tractive force linearly with the distance travelled.

These features together with the various ancillary provisions and features which will become apparent to those skilled in the art from the following detailed description, are attained by the methods and apparatus of the present invention, preferred embodiments thereof being shown with reference to the accompanying drawings, by way of example only, wherein:

BRIEF DESCRIPTION OF THE SEVERAL VIEWS OF THE DRAWING

FIG. 4 is a perspective view of one embodiment of a vehicle;

FIG. 5 is a top view of the vehicle of FIG. 4;

FIG. 6 as a front view of the vehicle of FIG. 4;

FIG. 7 is a side view of the vehicle of FIG. 4;

FIG. 8 is a sectional view 8-8 of FIG. 7 illustrating details of the rear drive wheel and idler wheel;

FIG. 9 is a front view of the vehicle of FIG. 4 with the idler wheel in a first configuration;

FIG. 10 is a front view of the vehicle of FIG. 4 with the idler wheel in a second configuration;

FIG. 13 is a top view of the vehicle of FIG. 4 with the front drive wheel positioned to move straight forward;

FIG. 14 is a top view of the vehicle of FIG. 4 with the front drive wheel positioned to turn the vehicle left;

FIG. 15 is a top view of the vehicle of FIG. 4 with the front drive wheel positioned to turn the vehicle right;

FIGS. 16A, 16B, 16C, 16D, 16E, and 16F, illustrate sequential actions of the vehicle of FIG. 4 turning through 180 degrees, as might be needed to be performed at the end of a furrow F.

FIG. 17 as a perspective view of a hitch 409 attached to a frame of the vehicle of FIG. 4;

FIG. 18 is a top view of the hitch of FIG. 17;

FIG. 19 is a side view of the hitch of FIG. 17;

FIG. 20 is an end view of the hitch of FIG. 17;

FIG. 21 is a perspective view of the hitch of FIG. 17 in a closed configuration;

FIG. 22 is a perspective view of the hitch of FIG. 17 in an open configuration;

Figure 2:
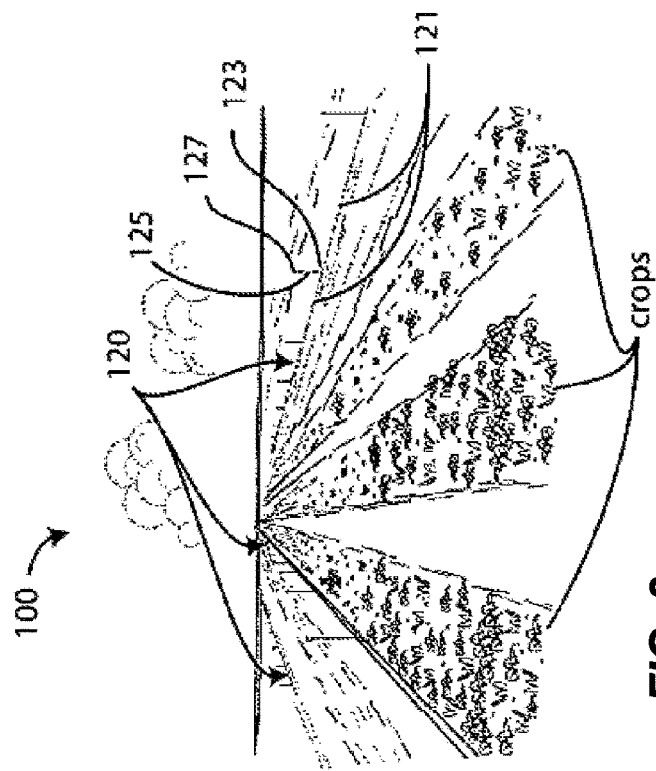
FIG. 2 is a perspective view of FIG. 1.
Figure 3:
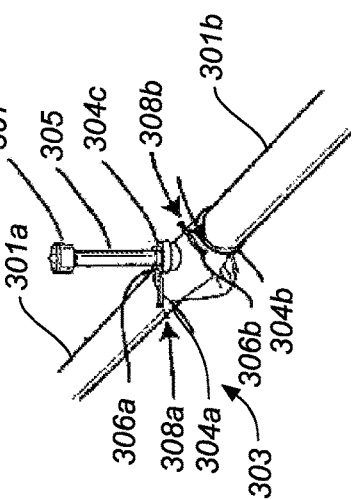
FIG. 3 is a perspective view of a specific coupler.
Figure 1:
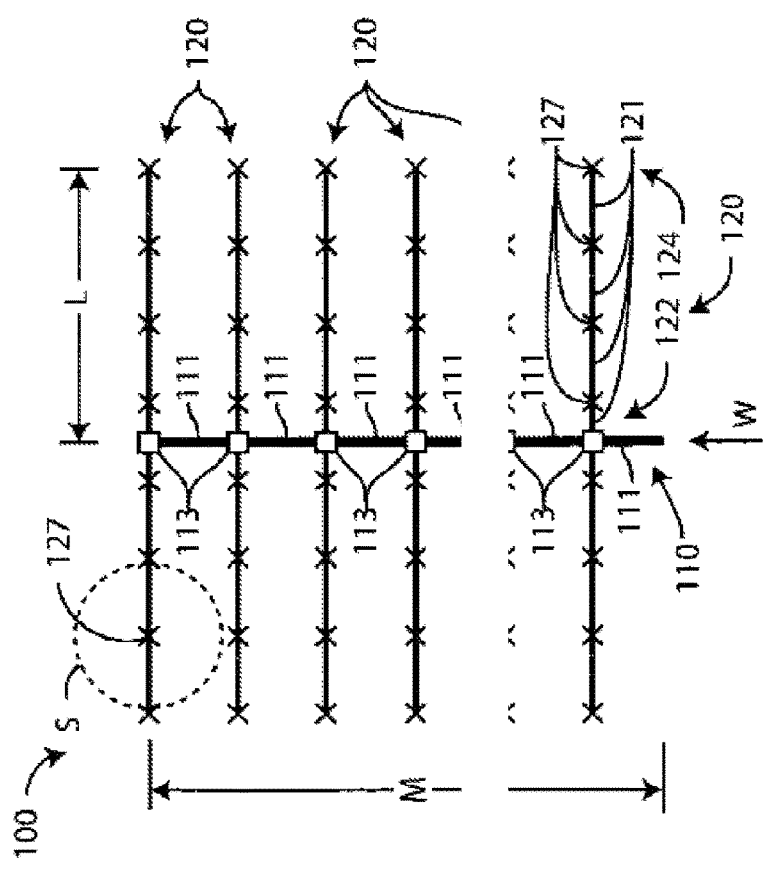
FIG. 1 shows a top schematic view of a prior art irrigation system for irrigating a field.

Reference symbols are used in the Figures to indicate certain components, aspects or features shown therein, with reference symbols common to more than one Figure indicating like components, aspects or features shown therein.

DETAILED DESCRIPTION OF THE INVENTION

The present invention includes various components of a vehicle and methods for operating a vehicle that, for example and without limitation, may be used in place of the vehicle of U.S. Pat. No. 7,1065,985 and which may be used for pulling a pipe segments, and thus placing irrigation pipe in an agricultural field.

One embodiment of a vehicle of the present invention is shown in FIGS. 4-7, where FIG. 4 is a perspective view of one embodiment of a vehicle 400, FIG. 5 is a top view of the vehicle of FIG. 4, FIG. 6 as a front view of the vehicle of FIG. 4; and FIG. 7 is a side view of the vehicle of FIG. 4.

As the terms are used herein: "drive wheel" refers to a wheel of vehicle 400 that is connected to a motor and which may be provided with power from the motor to drive the vehicle; "idler wheel" refers to a wheel of the vehicle that is unpowered; the "centerline" of a wheel is a line (or plane) down the center of the width of the wheel; and "track width" is the lateral distance between the centerline of two wheels.

Vehicle 400 has a front 402 and a rear 404, and includes a frame 401 that supports wheels in a tricycle configuration including a front drive wheel 403 at or near the front and having an axis of rotation, RF, a rear drive wheel 405 having an axis of rotation, RR, and an idler wheel 407 having an axis of rotation RI, and a hitch 409 at the rear which is adapted to accept the end of a pipe, such as end of pipe segment. In certain embodiments, front drive wheel 403 and rear drive wheel 405 both have the same centerline, CL1, and are in line with hitch 409. In certain embodiments, the axis of rotation RR and RF are generally colinear. In certain other embodiments, idler wheel 407 has a centerline CL2 that is laterally displaced from centerline CL1 by a distance W, which is the track width of vehicle 400, as discussed subsequently.

Vehicle 400 also includes a hydraulic system 410 including a hydraulic conditioning unit (HCU) shown as a HCU 415, that stores, filters, and cools a hydraulic oil, which is powered by an engine 411 having an associated a fuel tank 417 and radiator 413. As examples which are not meant to limit the scope of the present invention, HCU 415 maybe an HCU35, manufactured by AKG Thermal Systems Inc., Mebane, NC USA, and engine 411 may be a Kubota model D1105 diesel engine, Kubota Corporation, Osaka, Japan. Vehicle 400 also includes a control system 420 that includes control and system electronics module 421, a GPS signal receiver 423, and an antenna 425. As discussed subsequently, hydraulic system 410 includes hydraulic power for front drive wheel 403 and rear drive wheel 405, for steering vehicle 400, and for opening and closing hitch 409, and provides electric power to operate control system 420.

Additional details of the vehicle are presented in FIGS. 8-10, where: FIG. 8 is a sectional view 8-8 of FIG. 7 illustrating details of the rear drive wheel and idler wheel; FIG. 9 is a front view of the vehicle of FIG. 4 with the idler wheel in a first configuration; and FIG. 10 is a front view of the vehicle of FIG. 4 with the idler wheel in a second configuration.

As shown in FIG. 8, rear drive wheel 405 has a rear hydraulic motor 803 to provide power to the rear drive wheel. Thus, for example and without limitation, pressurized hydraulic fluid from HCU 415 is supplied to a rear hydraulic motor valve 815 located on vehicle 400, and then to rear hydraulic motor 803. Rear hydraulic motor valve 815 may be, in various embodiments, a manual valve and/or a remotely controlled valve, and thus the rear hydraulic motor may be controlled by the rear hydraulic motor valve.

FIG. 8 also shows an axle of idler wheel 407, which is unpowered, as idler wheel spindle 801, which is attached to a sliding axle tube 807. Sliding axle tube 807 has an outer diameter that fits within an inner diameter of a fixed axle tube 805. A hydraulic cylinder 809 connects fixed axle tube 805 and sliding axle tube 807. The length of hydraulic cylinder 809 determines the distance, W, between rear drive wheel 405 and idler wheel 407. Thus, for example and without limitation, pressurized hydraulic fluid from HCU 415 is supplied to a hydraulic cylinder valve 817 located on vehicle 400, and then to hydraulic cylinder 809. Hydraulic cylinder valve 817 may be, in various embodiments, a manual valve and/or a remotely controlled valve, and thus hydraulic cylinder 809 may be controlled by the hydraulic cylinder valve 817.

As shown in FIGS. 9 and 10, the length of hydraulic cylinder 809 adjusts track width, W, which can be adjusted for a range of bed widths between a minimum track width, $W_{min}$, as shown in FIG. 9, and a maximum track width, $W_{max}$, as shown in FIG. 10. In embodiments the track width ranges from $W_{min}$=60 inches to $W_{max}$=84 inches.

Idler wheel 407 may also include an idler drive wheel rotary encoder 813 that measures the rotation of the idler drive wheel along the ground provides encoded information to control and system electronics module 421 to provide feedback for controlling vehicle 400.

Figure 11:
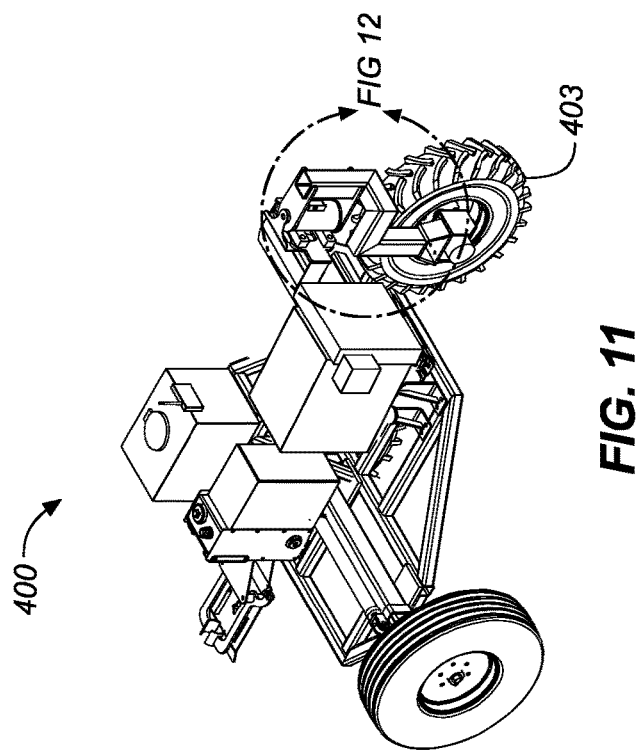
FIG. 11 is a perspective view of the vehicle of FIG. 4.
Figure 12:
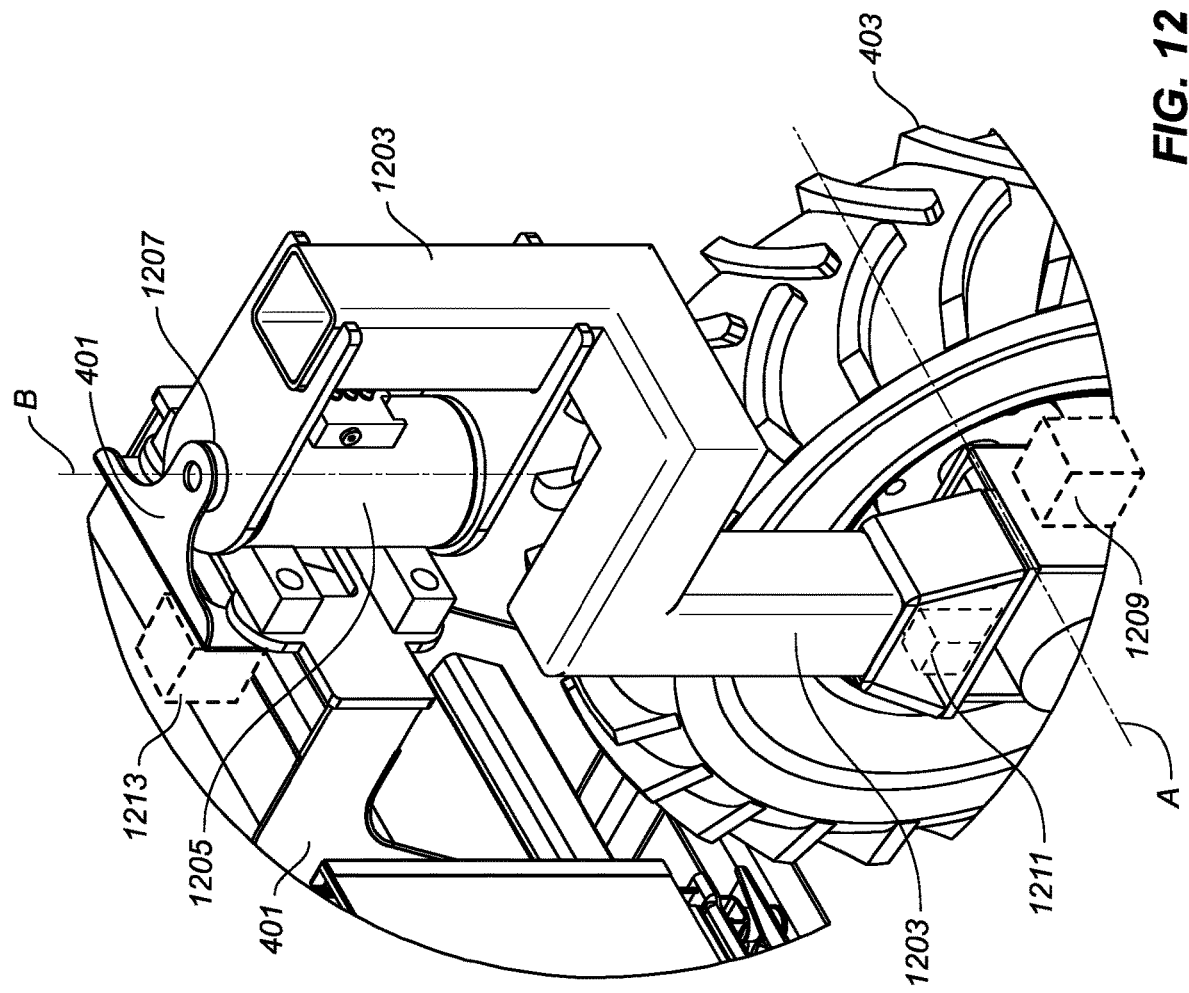
FIG. 12 is a view 12-12 of FIG. 11.

Additional details of the turning ability of the vehicle are shown in FIGS. 11 and 12, where FIG. 11 is a perspective view of the vehicle of FIG. 4, and where FIG. 12 is a view 12-12 of FIG. 11.

As shown in FIG. 12, front drive wheel 403 has a front hydraulic motor 1201 to provide power to the front drive wheel, which rotates about a wheel axis RFD. Thus, for example and without limitation, pressurized hydraulic fluid from HCU 415 is supplied to a front hydraulic motor valve 1211 located on vehicle 400, and then to front hydraulic motor 1201. Front hydraulic motor valve 1211 may be, in various embodiments, a manual valve and/or a remotely controlled valve, and thus the rear hydraulic motor may be controlled by the rear hydraulic motor valve. Front drive wheel 403 may also include a front wheel rotary drive encoder 1209 that measures the rotation of the front drive wheel along the ground and monitors tire slippage, and provides the encoded information to control and system electronics module 421, where the information may be used to provide feedback for controlling vehicle 400.

Vehicle 400 is steerable according to the rotation of front drive wheel 403 about a rotational axis B relative to frame 401, where rotational axis B is perpendicular to wheel axis RFD. Thus, front hydraulic motor 1201 is supported by a bracket 1203 that is connected to a hydraulic rotary actuator 1205, where the hydraulic rotary actuator is connected to frame 401. Hydraulic rotary actuator 1205 rotates about a rotational axis B relative to frame 401 for steering vehicle 400. In certain embodiments, hydraulic rotary actuator 1205 provides controllable steering of the front drive wheel 403 by ±90° about a center configuration.

Thus, for example and without limitation, pressurized hydraulic fluid from HCU 415 is supplied to steering control valve 1213 located on vehicle 400, and then to hydraulic rotary actuator 1205. Steering control valve 1213 may be, in various embodiments, a manual valve and/or a remotely controlled valve, and thus the rear hydraulic motor may be controlled by the rear hydraulic motor valve. In addition, a steering encoder 1207 measures the rotation about rotational axis B, and provides encoded steering information to control and system electronics module 421 to provide feedback for controlling the steering of the vehicle.

Details of the steering of the vehicle are shown in FIGS. 13-15, where FIG. 13 is a top view of the vehicle of FIG. 4 with the front drive wheel positioned to move straight forward, FIG. 14 is a top view of the vehicle of FIG. 4 with the front drive wheel positioned to turn the vehicle left, and FIG. 15 is a top view of the vehicle of FIG. 4 with the front drive wheel positioned to turn the vehicle right.

FIGS. 13-15 illustrate that the hydraulic rotary actuator may controllably turn the front drive wheel through ±90° about a forward direction. In FIG. 14, the axis of rotation of front drive wheel 403 about rotational axis B is such the axis of rotation the front drive wheel is parallel to the axis of rotation of rear drive wheel 405 and idler wheel 407, and providing power to front drive wheel 403 and/or rear drive wheel 405 results in vehicle 400 moving straight forward. In FIG. 15, hydraulic fluid is provided to hydraulic rotary actuator 1205 to rotate front drive wheel 403 by −90° about rotational axis B relative to the configuration in FIG. 14. When power is then provided to front drive wheel 403, vehicle 400 pivots to the left about a pivot axis C. In FIGS. 16A-16F, hydraulic fluid is provided to hydraulic rotary actuator 1205 to rotate front drive wheel 403 by rotated +90° about rotational axis B relative to the configuration in FIG. 14. When power is the provided to front drive wheel 403, vehicle 400 pivots to the right about a pivot axis C.

FIGS. 16A through 16F, illustrate sequential actions of the turning vehicle 400 through 180 degrees, as might be needed to be performed at the end of a furrow F. In the steps of FIGS. 16A-16E, no drive power is provided to rear drive wheel 405. In the step of FIG. 16A, no drive power is provided to front drive wheel 403, and hydraulic fluid is provided hydraulic rotary actuator 1205 to turn the front drive wheel begins to turn left. In the step of FIG. 16B, hydraulic rotary actuator 1205 has turned front drive wheel 403 to the left, as shown in FIG. 14. In the steps of FIGS. 16C and 16E, hydraulic power is provided to front drive wheel 403, causing vehicle 400 to pivot about pivot axis C. At the step of FIG. 16E, vehicle 400 has rotated 180 degrees from the configuration of FIG. 16A, and with no drive power provided to front drive wheel 403, hydraulic fluid is provided hydraulic rotary actuator 1205 to turn the front drive wheel begins to the right until the wheel is oriented as in FIG. 13. With the vehicle so rotated, power may be provided to front drive wheel 403 and/or rear drive wheel 405, and vehicle 400 may then be propelled back down furrow F.

In an alternative embodiment, when vehicle 400 moves to the end of a first furrow it is maneuvered to the same end of a second furrow that is parallel to the first farrow, and returns down the second furrow. Thus, for example and without limitation, when vehicle 400 reaches the end of a first furrow (as in FIG. 16A), the vehicle stops, then sequentially 1) stop providing power to front drive wheel 403 and rear drive wheel 405; 2) rotate the front drive wheel by 90 degrees to the left, as in FIG. 14; 3) provide power to front drive wheel 403 to pivot the entire vehicle 400 by 90 degrees to the left about pivot axis C; 4) rotate the front drive wheel back 90 degrees to center to the configuration in FIG. 13; 4) provide power to front drive wheel 403 and rear drive wheel 405 to move the vehicle until pivot axis C is aligned with the second furrow; 5) stop providing power to front drive wheel and rear drive wheel; 6) rotate the front drive wheel by 90 degrees to the left, as in FIG. 14; and 7) provide power to front drive wheel to pivot the entire vehicle 400 by 90 degrees to the left until the vehicle is aligned with the second furrow.

FIG. 17 as a perspective view of hitch 409 attached to frame 401, FIGS. 18, 19, and 20 are a top view, a side view, and an end view, respectively of the hitch, and FIGS. 21 and 22 are perspective views of the hitch in a closed and open configuration, respectively.

As shown in FIG. 17, hitch 409 is attached to frame 401 with an articulating link 1701 that permits horizontal and vertical movement. As described subsequently, vehicle 400 can move through an agricultural field and hitch 409 may be hydraulically actuated with a pair of grip surfaces that to hold the end of a pipe segment, such as main line pipe segments 111 or lateral pipe segments 121 to move a length of pipe in the agricultural field, and to release the pipe for placement in the agricultural field.

As shown in FIGS. 18, 19, and 20, hitch 409 includes a top plate 1801 having an aperture 1802, a bottom plate 1803 including a left pipe guide 1809 and a right pipe guide 1811, a left arm 1805 extending from a left end 1827 to a left grip surface 1813, a right arm 1807 extending from a right end 1829 to a right grip surface 1815, a left bushing 1817 connecting the top plate, the bottom plate and the left arm, a right bushing 1819 connecting the top plate, the bottom plate and the right arm, a hydraulic cylinder 1821 connecting left end and right end, a coordinating link 1823 extending between the left arm and the right arm, and a microswitch 1825.

Hitch 409 thus includes top plate 1801 and bottom plate 1803 having left pipe guide 1809 and right pipe guide 1811 and left arm 1805 and right arm 1807 that are disposed between the top and bottom plate by a right arm 1807 and left pipe guide 1809 that permit rotation of the right arm and left arm. Top plate 1801 is coupled to frame 401, by an articulating link 1701 that independently rotates in the horizontal and vertical direction. Each of left arm 1805 and right arm 1807 a grip surface—left grip surface 1813 and right grip surface 1815, respectively—at one end and are coupled by hydraulic cylinder 1821 at the other end, and are coupled by coordinating link 1823 near left bushing 1817 and right bushing 1819.

Hydraulic cylinder 1821 controllably accepts pressurized hydraulic fluid from HCU 415 according to a clamp valve 1831 on vehicle 400, where the clamp valve is, in various embodiments, a manual valve and/or a remotely controlled valve. As shown in FIGS. 21 and 22, can thus move between a closed configuration in FIG. 21 and a closed configuration in FIG. 22. Specifically, the movement of hydraulic cylinder 1821 causes left arm 1805 and right arm 1807 to pivot about left bushing 1817 and right bushing 1819, respectively. This motion, mediated by coordinating link 1823 causes left grip surface 1813 and right grip surface 1815 to move towards and away from each other. Thus, in FIG. 21, hydraulic cylinder 1821 is extended, causing left grip surface 1813 and right grip surface 1815 to move towards one another. Left grip surface 1813 and right grip surface 1815 are shaped to hold irrigation pipe. Thus, when irrigation pipe is placed within hitch 409 and between left pipe guide 1809 and right pipe guide 1811 and when hydraulic cylinder 1821 is extended, hitch 409 grips the end of the pipe. When hydraulic cylinder 1821 is contracted, as shown in FIG. 22, left grip surface 1813 and right grip surface 1815 move away from each other. The configuration of FIG. 21, may be used to either release the end of the pipe segment or to open to accept the end of a pipe segment. Microswitch 1825 is placed to detect the presence of pipe between left pipe guide 1809 and right pipe guide 1811 and provide a signal to control and system electronics module 421 indicating the presence or absence of pip within hitch 409 which may provide feedback for controlling the placement of irrigation pipe.

In an alternative embodiment, a manual switch (not shown) may be manually actuated to grip a pipe end, as shown in FIG. 20. In another alternative embodiment, the electronics/control system adjusts the hydraulic pressure in hydraulic cylinder 1821 to remotely release the end of a pipe segment.

Figure 24:
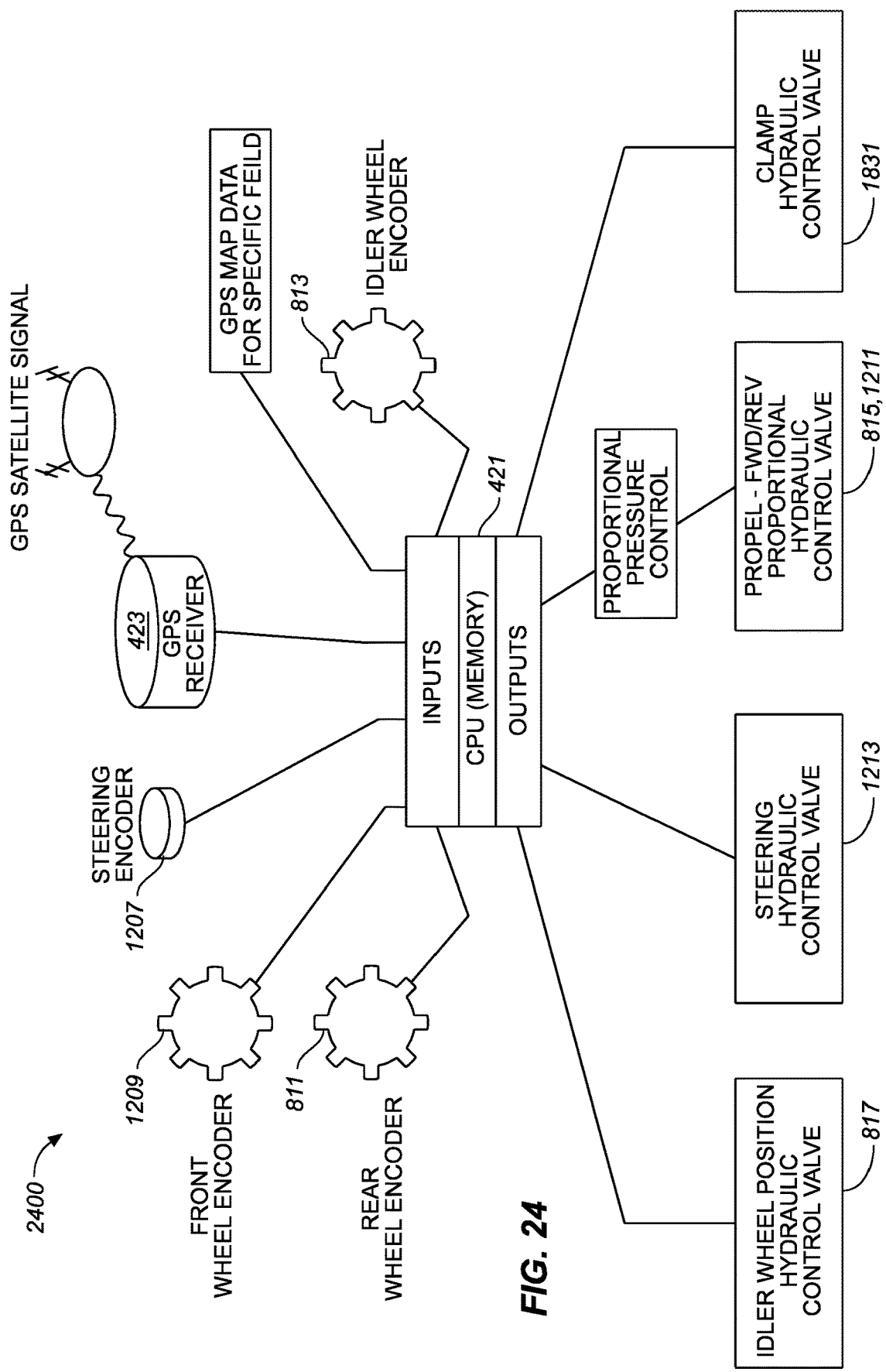
FIG. 24 is a schematic of a first embodiment control system for an autonomously guided vehicle of FIG. 4.

Control and system electronics module 421 may, as shown in FIG. 24, include, for example and without limitation, memory and a processor that is programmed, for example and without limitation, to receive remote instructions using antenna 425 via radio, to store map information and receive GPS signals using GPS signal receiver 423, receive sensor readings from vehicle 400, including and not limited to sensor readings from one or more of rear drive wheel rotary encoder 811, idler drive wheel rotary encoder 813, and/or steering encoder 1207, and perform calculations or otherwise control hydraulic pressures to the various vehicle components including but not limited to steering control valve 1213, rear hydraulic motor valve 815, hydraulic cylinder valve 817, hydraulic rotary actuator 1205, steering control valve 1213. Control and system electronics module 421 may, in certain embodiments, automate some of the functions of the vehicle, which include, but are not limited to, propelling the vehicle along a furrow of a field, steering the vehicle along a furrow of a field, turning the vehicle around, changing the track width of the vehicle, and clamping and unclamping a pipe segment in the hitch. In certain embodiments, some of the functions may be manually performed, such as changing the track width of the vehicle by adjusting the idler wheel position relative to the rear drive wheel. In certain other embodiments, some of the functions may be performed remotely. Thus, for example and without limitation, the vehicle may include a remote-control system that communicates with an electronics/control system unit on the vehicle. A user my provide remote steering or speed instructions to the vehicle, which adjust, respectively, the rotation of the front wheel perpendicular to the front wheel axis and the power to the drive wheels. A user may also provide instructions to the hitch to decouple the pipe section. In other embodiments, some of the functions may be performed automatically. Thus, for example and without limitation, the hitch may include a pipe segment sensor that clamps the hitch on an inserted pipe segment. Further, for example, a map of the terrain to be services may be uploaded to the electronics/control system and, using the vehicle location as determined by a vehicle-mounted GPS, the vehicle may autonomously propel and steer the vehicle.

Figure 23A:
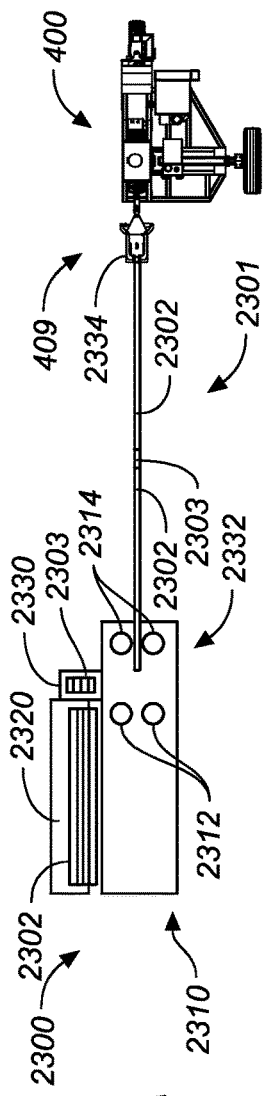
FIGS. 23A, 23B, 23C, and 23D are a temporal sequence of top views of a pipe manipulation device as it is assembling a length of a pipe.
Figure 23B:
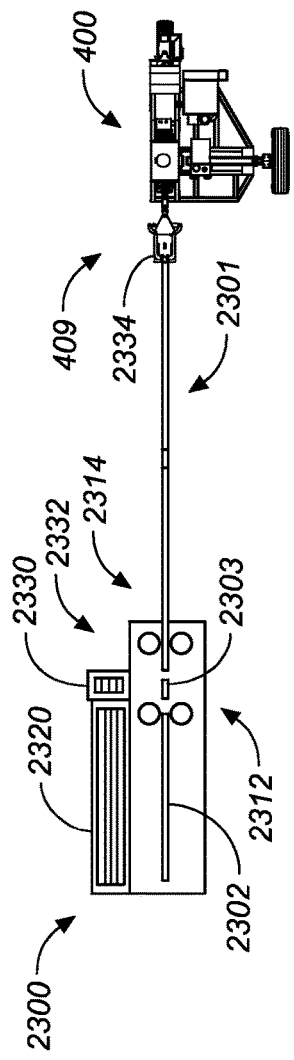
Figure 23C:
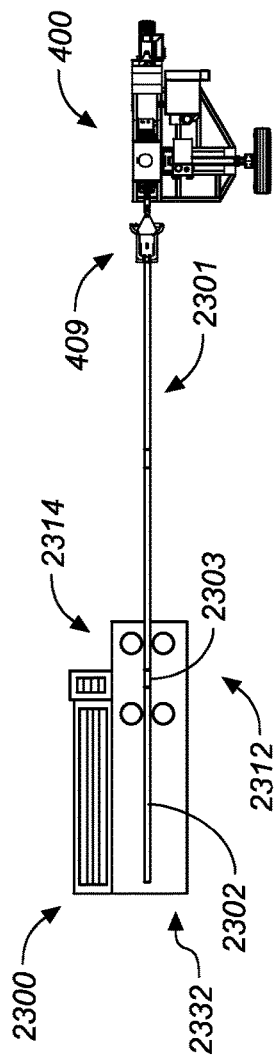
Figure 23D:
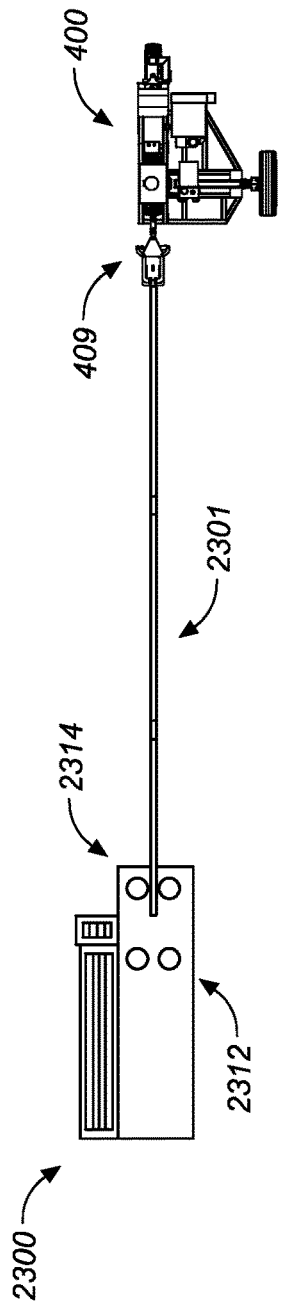

In certain embodiments, vehicle 400 is used to pull a pipe as it is assembled from pipe segments. FIGS. 23A-23D are a temporal sequence of top views of a pipe manipulation device 2300 as it is assembling a length of a pipe 2301 having a first end 2334 and a second end 2332 with the first end secured by hitch 409 and pulled by vehicle 400. Specifically, FIG. 23A shows a length of pipe partially assembled, FIG. 23B shows a pipe section and coupler being placed near an end of the pipe, FIG. 23C shows the pipe section being coupled to the end of the pipe, and FIG. 23D shows the pipe and newly coupled section being pulled into a field. A more detailed description of pipe manipulation device 2300 may be found, for example and without limitation, in U.S. Pat. No. 7,765,685 which is incorporated herein by reference. describes a pipe coupling device, and are shown.

Pipe manipulation device 2300 accepts a plurality of pipe segments 2302, such as main line pipe segments 111 or lateral pipe segments 121, in a pipe carrier 2320 and a plurality of couplers 2303, such as couplers 113 in a coupler carrier 2330 and includes a pipe drive mechanism 2310 having a first pair of rollers 2312 and a second pair of rollers 2314 for pushing or pulling assembled pipe out of or into the device. With pipe manipulation device 2300 positioned on the ground and, through the manipulation of pipe segments 2302 and couplers 2303, produces pipe 2301 of increasing length, with an end gripped by hitch 409 moving away from the device. The addition of length to pipe 2301 is shown in FIGS. 23B through 23D. As shown in FIG. 23B, second end 2332 is contacted by second pair of rollers 2314. A single segment 2302' is removed by a mechanism (not shown) from pipe carrier 2320 and aligned near end second end 2332 and contacting second pair of rollers 2314, and a pipe coupler 2303' is removed from coupler carrier 2330 and placed between second end 2332 and segment 2302'.

Next, as shown in FIG. 23C, pipe segment 2302' and coupler 2303' are brought together and coupled to pipe 2301, resulting in a pipe 2301' having an increased length and a second end 2332'.

After pipe 2301' is formed by joining pipe segment 2302' to pipe 2301, as shown in FIG. 23D, pipe 2301' is transported from pipe manipulation device 2300 by rollers 2312. End 14 is supported and pulled by a vehicle 400. Additional length of pipe is then added by repeating the steps illustrated in FIGS. 23B-23D. In certain other embodiments, vehicle 400 is programmed to automatically stop at predetermined distances to permit the addition of an additional pipe segment.

As vehicle 400 advances by the length of the pipe segment, an additional pipe segment is added, and the length of pipe being pulled by vehicle 400 increases linearly with the distance travelled by the vehicle from where the first pipe segment was attached to hitch 409. In this scenario, the tractive force required to pull on an ever-increasing length of pipe being pulled increases roughly linearly with pipe length.

In one embodiment, control and system electronics module 421 determines the length of pipe, which is roughly the distance covered from the time pipe segment was attached to the vehicle. This length may be determined from GPS signal receiver 423 and/or from one or more of rear drive wheel rotary encoder 811, idler drive wheel rotary encoder 813, and/or front wheel rotary drive encoder 1209. The tractive force supplied by front drive wheel 403 and/or rear drive wheel 405 is controlled by signals sent to front hydraulic motor valve 1211 and/or rear hydraulic motor valve 815 respectively, which adjust the torques of the motors. In certain embodiments, the valves adjust the torque provided by each motor such that the tractive force for each wheel increases linearly with the distance travelled. The force may be affected by conditions in the field, such as the type of soil. Control and system electronics module 421 estimates the amount of force required based on the distance traversed from the start of pulling pipe and adjusts the hydraulic force to the front and rear drive motors. In one embodiment, the relationship between the distance and force is determined by an experimental determination.

FIG. 24 is a schematic of a first embodiment control system 2400 for an autonomously guided vehicle 400. Control and system electronics module 421 receives locating information from GPS signal receiver 423, encoder information from idler drive wheel rotary encoder 813, front wheel rotary drive encoder 1209, rear drive wheel rotary encoder 811, steering encoder 1207, and a map of the field to be irrigated. Control and system electronics module 421 determines the desired track width of the vehicle in the field and the required drive wheel tractive force in proportion to the amount of pipe being pulled, as described above, and provides control signal to steering control valve 1213, rear hydraulic motor valve 815, front hydraulic motor valve 1211, hydraulic cylinder valve 817, and clamp valve clamp valve 1831.

Figure 25:
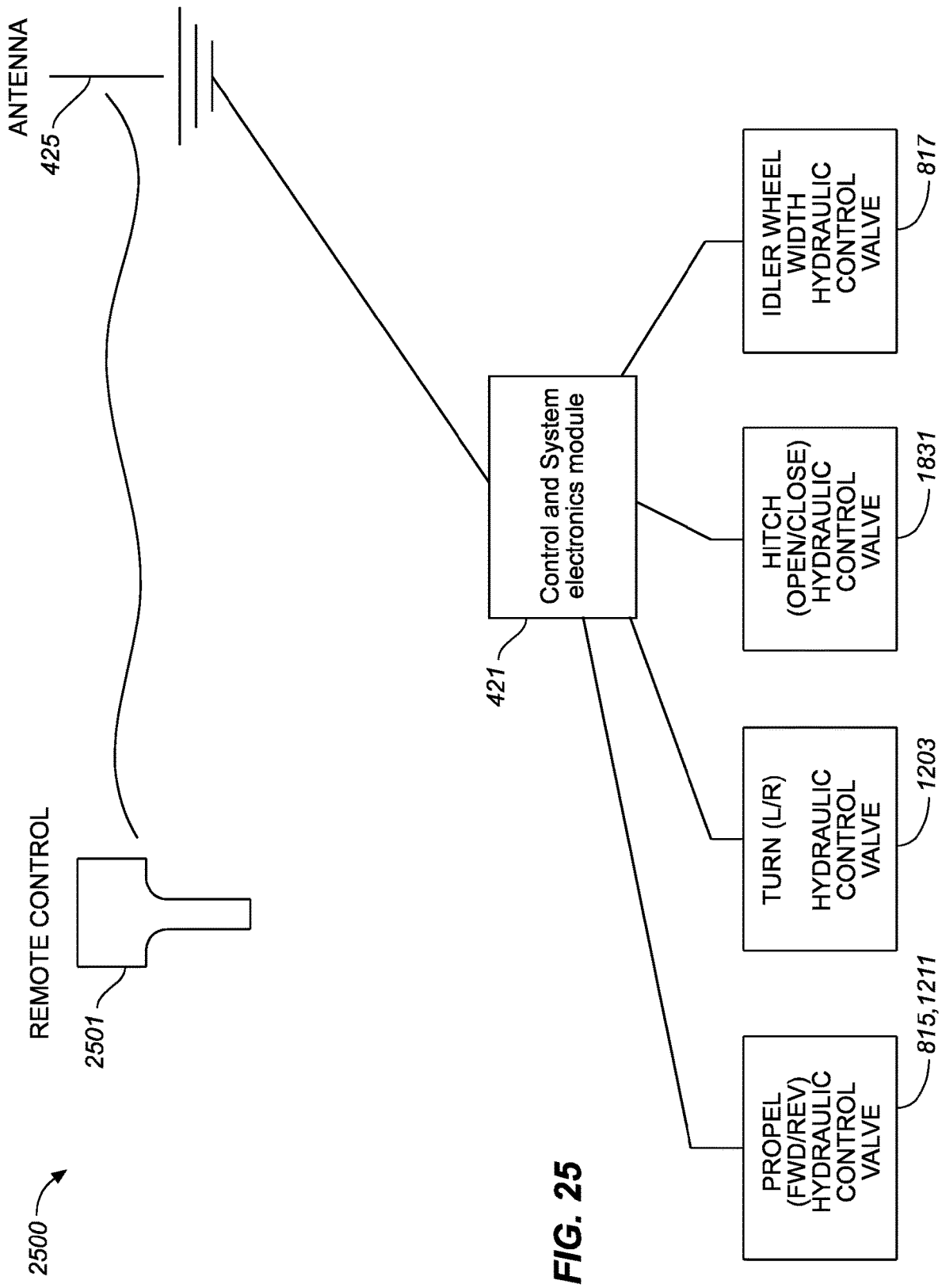
FIG. 25 is a schematic of a second embodiment of a control system for a remote controlled vehicle of FIG. 4.

FIG. 25 is a schematic of a second embodiment of a control system 2500 for a remote controlled vehicle 400. A remote control 2501 is in communication with control and system electronics module 421 via antenna 425. Control and system electronics module 421 receives a remote-control signal for steering the vehicle and, with or without a GPS signal, the control system providing signals to operate rear hydraulic motor valve 815, front hydraulic motor valve 1211, steering control valve 1213, clamp valve 1831, and hydraulic cylinder valve 817, where front drive wheel 403 and rear drive wheel 405 are adjusted to provide an increased force with distance travelled, as discussed above.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, XXX.

The invention claimed is:

1. An adjustable track width vehicle for providing pipe to an agricultural field, said vehicle including,
 a frame;
 a hitch attachable to an end of a length of pipe;
 a front wheel supported by the frame, where said front wheel is a front drive wheel;
 a pair of rear wheels supported by the frame, where said pair of rear wheels includes a rear drive wheel and an idler wheel;
 an actuator coupling said pair of wheels, where the actuator is operable to adjust the track width of the pair of wheels; and
 electronics including a processor and memory, where said processor is programmed to determine a distance travelled and to adjust a tractive force of the front drive wheel and the tractive force of the rear drive wheel according to the distance travelled,
 where the electronics adjust the tractive force linearly with the distance travelled.

2. The vehicle of claim 1, where said rear drive wheel has an axis of rotation, where said idler wheel has an axis of rotation, and where the axis of rotation of the rear drive wheel is colinear with the axis of rotation of the idler wheel.

3. The vehicle of claim 2, where said front drive wheel is steerable.

4. The vehicle of claim 3, where said front drive wheel is steerable by at least ±90 degrees.

5. The vehicle of claim 3, where said rear drive wheel is in line with the front drive wheel.

6. The vehicle of claim 5, where the vehicle has a distance travelled from an initial location, where the length of pipe increases linearly with the distance travelled, and where a tractive force provided to the front drive wheel and to the rear drive wheel increases linearly with distance travelled.

7. The vehicle of claim 3, where said vehicle includes a hydraulic system including a hydraulic conditioning unit (HCU) that provides hydraulic fluid to a front hydraulic motor that powers the front drive wheel according to a setting or a front hydraulic motor valve and provides hydraulic fluid to a rear hydraulic motor that powers the rear drive wheel according to a setting on a rear hydraulic motor valve, and where said actuator is a hydraulic cylinder, where said HCU provides hydraulic fluid to the actuator according to a setting on a hydraulic cylinder valve.

8. The vehicle of claim 7, where said processor is programmed to determine a distance travelled and to adjust a tractive force of the front drive wheel according to the front motor valve setting and to adjust the tractive force of the rear drive wheel according to the rear motor valve setting, where the tractive force increases linearly with the distance travelled.

9. The vehicle of claim 8, where said processor is programmed to adjust the track width by adjusting the setting on the hydraulic cylinder valve.

10. An adjustable track width vehicle for providing pipe to an agricultural field, where the vehicle has a distance travelled from an initial location, where the length of pipe increases linearly with the distance travelled, said vehicle including:
 a frame;
 a hitch attachable to an end of a length of pipe;
 a front drive wheel supported by the frame, where said front drive wheel is powered by a front hydraulic motor and is steerable;
 a pair of rear wheels supported by the frame, where said pair of rear wheels includes a rear drive wheel and an idler wheel, where said rear drive wheel is powered by a rear hydraulic motor, has an axis of rotation and is in line with the front drive wheel, where said idler wheel has an axis of rotation, and where the axis of rotation of the rear drive wheel is colinear with the axis of rotation of the idler wheel;
 an hydraulic cylinder coupling said pair of wheels, where the hydraulic cylinder is operable to adjust the track width of the pair of wheels,
 a hydraulic system including a hydraulic conditioning unit (HCU) that provides hydraulic fluid to a front hydraulic motor according to a setting or a front hydraulic motor valve, provides hydraulic fluid to a rear hydraulic motor according to a setting on a rear hydraulic motor valve, and provides hydraulic fluid to the hydraulic cylinder according to a setting on a hydraulic cylinder valve, and where a tractive force provided to the front drive wheel and to the rear drive wheel increases linearly with distance travelled according to the setting on the front hydraulic motor valve and the on the rear hydraulic motor valve; and
 electronics including a processor and memory, where said processor is programmed to determine a distance travelled and to adjust the setting on the front hydraulic motor valve and the on the rear hydraulic motor valve according to the distance travelled,
 where a tractive force is provided to the front drive wheel and to the rear drive wheel that increases linearly with distance travelled according to the setting on the front hydraulic motor valve and the on the rear hydraulic motor valve.

11. The vehicle of claim 10, where said front drive wheel is steerable by at least ±90 degrees.

12. A method for a vehicle to pull a length of irrigation pipe over a ground, where the length of irrigation pipe is a distance travelled by the vehicle from an initial location, where the vehicle includes one or more drive wheels capable of imparting a tractive force to the ground, said method comprising:
 determining a distance travelled by the vehicle from an initial location; and
 increasing the tractive force to said one or more drive wheels in proportion to the distance travelled.

13. The method of claim 12, where said tractive force increases linearly with the distance travelled.

14. The method of claim 12, where increasing the tractive force includes increasing a torque provided to each of said one or more drive wheels.

15. The method of claim 12, where each drive wheel of said one or more drive wheels is powered by a corresponding a hydraulic motor, where the vehicle includes a hydraulic system adapted to provide a controllable pressure of a hydraulic fluid to each hydraulic motor corresponding to the one or more drive wheels, and where said increasing the tractive force includes increasing the pressure of the hydraulic fluid to each hydraulic motor corresponding to the one or more drive wheels.

16. The method of claim 12, where said vehicle includes:
 a front drive wheel, where said front drive wheel is steerable;
 a pair of rear wheels, where said pair of rear wheels includes a rear drive wheel and an idler wheel, where said rear drive wheel has an axis of rotation and is in line with the front drive wheel, where said idler wheel has an axis of rotation, and where the axis of rotation of the rear drive wheel is colinear with the axis of rotation of the idler wheel;
- a hydraulic cylinder coupling said pair of rear wheels, where the hydraulic cylinder is operable to adjust a track width of the pair of rear wheels;
- a hydraulic system including a hydraulic conditioning unit (HCU) that provides hydraulic fluid to a front hydraulic motor according to a setting or a front hydraulic motor valve, provides hydraulic fluid to a rear hydraulic motor according to a setting on a rear hydraulic motor valve, and provides hydraulic fluid to the hydraulic cylinder according to a setting on a hydraulic cylinder valve, and
- where said vehicle further include electronics including a processor and memory, where said processor is programmed to determine a distance travelled by the vehicle from an initial location, and increase the tractive force by the one or more drive wheels as the distance travelled increases.

17. An apparatus including vehicle to pull a length of irrigation pipe over a ground, where the length of irrigation pipe pulled by the vehicle increases with a distance travelled by the vehicle from an initial location, where the vehicle includes one or more drive wheels each powered by a motor, and electronics including a processor and memory, where said processor is programmed to:
- determine a distance travelled by the vehicle from an initial location, and
- increase a tractive force of the one or more drive wheels with the distance travelled.

18. The apparatus of claim 17, where said one or more drive wheels include:
- a front drive wheel powered by a front hydraulic motor;
- a rear drive wheel powered by a front hydraulic motor, where said rear drive wheel is in line with the front drive wheel; and
- a hydraulic system that provides hydraulic fluid to the front hydraulic motor according to a setting on a front hydraulic motor valve and provides hydraulic fluid to a rear hydraulic motor according to a setting on a rear hydraulic motor valve.

19. The apparatus of claim 18, where said vehicle further includes:
- a front drive wheel that is steerable;
- an idler wheel having an axis of rotation colinear with an axis of rotation of the rear drive wheel;
- an hydraulic cylinder coupling said idler wheel and said rear drive wheel, where the hydraulic cylinder is operable to adjust a track width of said idler wheel and said rear drive wheel; and
- where said a hydraulic system provides hydraulic fluid to the hydraulic cylinder according to a setting on a hydraulic cylinder valve.

20. The vehicle of claim 19, where said front drive wheel is steerable by at least ±90 degrees.

21. The vehicle of claim 19, where said processor is programmed to increase the tractive force by adjusting the setting on the front hydraulic motor valve and the setting on the rear hydraulic motor valve according to the distance travelled.

22. The vehicle of claim 21, where the setting on the front hydraulic motor valve and the rear hydraulic motor valve are adjusted to increase the tractive force linearly with the distance travelled.

* * * * *